United States Patent
Eickhoff et al.

(10) Patent No.: US 11,294,377 B2
(45) Date of Patent: Apr. 5, 2022

(54) AUTONOMOUS VEHICLE MANEUVER RECOGNITION

(71) Applicant: Sentera, Inc., Minneapolis, MN (US)

(72) Inventors: Brian Eickhoff, Minneapolis, MN (US); Andrew Muehlfeld, Minneapolis, MN (US)

(73) Assignee: Sentera, Inc., St. Paul, MN (US)

( * ) Notice: Subject to any disclaimer, the term of this patent is extended or adjusted under 35 U.S.C. 154(b) by 155 days.

(21) Appl. No.: 16/790,099

(22) Filed: Feb. 13, 2020

(65) Prior Publication Data

US 2020/0209863 A1 Jul. 2, 2020

Related U.S. Application Data

(63) Continuation of application No. 15/424,423, filed on Feb. 3, 2017, now Pat. No. 10,613,534.

(51) Int. Cl.
| | |
|---|---|
| *G05D 1/00* | (2006.01) |
| *G01C 21/20* | (2006.01) |
| *G01C 11/02* | (2006.01) |
| *G01S 19/42* | (2010.01) |

(52) U.S. Cl.
CPC ........... *G05D 1/0094* (2013.01); *G01C 11/02* (2013.01); *G01C 21/20* (2013.01); *B64C 2201/141* (2013.01); *G01S 19/42* (2013.01)

(58) Field of Classification Search
CPC ............ B64C 2201/00; B64C 2201/14; B64C 2201/141; G01C 11/00; G01C 11/02; G01C 21/00; G01C 21/20; G01S 19/00; G01S 19/38; G01S 19/39; G01S 19/42; G05D 1/00
See application file for complete search history.

(56) References Cited

U.S. PATENT DOCUMENTS

| | | | |
|---|---|---|---|
| 9,309,004 B2 * | 4/2016 | Mercer | ................. B64D 43/02 |
| 9,609,288 B1 * | 3/2017 | Richman | ................ H04N 7/185 |
| 9,823,658 B1 | 9/2017 | Loveland et al. | |
| 2016/0327959 A1 | 11/2016 | Brown et al. | |

* cited by examiner

*Primary Examiner* — Charles J Han
(74) *Attorney, Agent, or Firm* — Hamre, Schumann, Mueller & Larson, P.C.

(57) ABSTRACT

Autonomous vehicles may include one or more onboard devices to perform various actions, such as a still image capture device. In contrast with using an auxiliary communication system to control a payload, a vehicle navigation sensor is used to monitor autonomous vehicle movements to match a predefined vehicle maneuver event, and trigger a payload event based on identification of the vehicle maneuver event. For example, this allows an autopilot system or a remote drone pilot to initiate an image capture device or send other commands based on vehicle maneuver event recognition.

19 Claims, 5 Drawing Sheets

AUTONOMOUS VEHICLE MANEUVER RECOGNITION

TECHNICAL FIELD

Embodiments described herein generally relate to vehicle navigation sensors.

BACKGROUND

There is an increasing use of autonomous vehicles, such as for surveillance, package delivery, and personal transportation. Autonomous vehicles may be completely autonomous, using one or more locations (e.g., waypoints) to define origins, destinations, or observation targets. Examples of completely autonomous vehicles may include unmanned aerial vehicles (UAVs) or "self-driving" cars. Autonomous vehicles may be partially autonomous, which may use a combination of locations and operator input to perform actions or travel between locations. An example of a partially autonomous vehicle may include remotely operated UAVs or remotely operated aerial drones.

Autonomous vehicles may include one or more payloads (e.g., onboard devices) to perform various actions, such as a still image capture device (e.g., a camera). Control of such payloads requires an auxiliary communication system. Such auxiliary communication systems can be expensive and may affect the navigation performance or flight performance of the vehicle. To avoid the need for an auxiliary communication system, many payload installations wastefully operate in an always-on state, which consumes power and data storage resources at all times. For location-specific or time-specific payloads such as cameras, the always-on state captures images outside of the intended target of interest. It is desirable to provide improved control over autonomous vehicle payloads.

DESCRIPTION OF EMBODIMENTS

The present subject matter provides a technical solution for various technical problems in providing control over autonomous vehicle payloads. In an embodiment, a vehicle navigation sensor (e.g., an inertial measurement system) is used to monitor autonomous vehicle movements to match a predefined "vehicle gesture pattern" (e.g., vehicle maneuver event), and trigger a payload event based on identification of the vehicle gesture pattern. For example, this would allow an autopilot system or a remote drone pilot to cue an image capture or another function on a drone payload system by flying a predefined maneuver.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
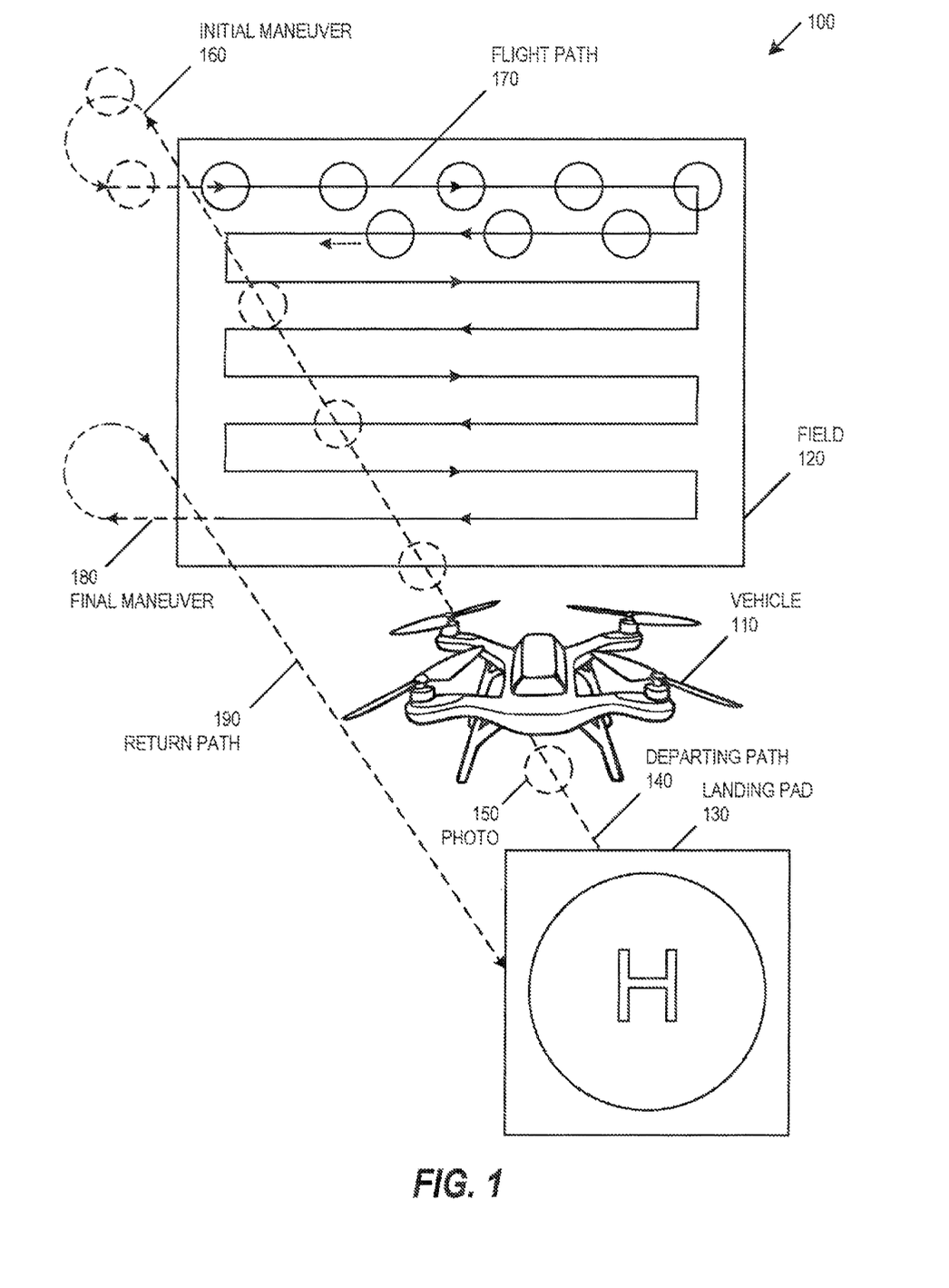
FIG. 1 is a block diagram of an example autonomous vehicle gesture recognition system, in accordance with at least one embodiment of the invention.

FIG. 1 is a block diagram of an example autonomous vehicle gesture recognition system 100, in accordance with at least one embodiment of the invention. Example system 100 includes an autonomous vehicle 110, such as an autonomous quadrotor helicopter equipped with a camera to take pictures of a field 120. Vehicle 110 may depart from a landing pad 130 using a predefined departing path 140.

In an embodiment, the camera installed on the vehicle 110 takes photos 150 at regular intervals along the departing path 140. Vehicle 110 may continue to take photos 150 at regular intervals while traversing the departing path 140 and while performing initial maneuver 160. Upon performing the initial maneuver 160, the vehicle 110 may continue taking pictures at regular intervals along a flight path 170. When the vehicle 110 has completed flight path 170, vehicle 110 performs a final maneuver 180 and returns along a return path 190 to landing pad 130.

The initial maneuver 160 and final maneuver 180 may include a suboptimal navigation maneuver (e.g., nonstandard navigation maneuver). As used herein, "suboptimal navigation maneuver" includes a maneuver that results in a desired change in the vehicle orientation or movement, but is accomplished through a maneuver other than an optimal maneuver. For example, a suboptimal navigation maneuver may include a 270-degree counterclockwise rotation, which results in the same final direction as an optimal 90-degree clockwise rotation. A suboptimal navigation maneuver may include a suboptimal combination of maneuvers, such as using a 90-degree clockwise azimuth rotation (i.e., 90-degree change in yaw) followed by a 90-degree upward rotation (i.e., 90-degree change in pitch) instead of completing the two rotations simultaneously. Suboptimal navigation maneuvers may include other maneuvers or combinations of maneuvers.

A navigation maneuver identification system may identify the initial maneuver 160 and final maneuver 180 based on navigation data provided by navigation sensors within vehicle 110. The navigation sensors may provide various types and combinations of output navigation data. For example, the navigation sensor may include an inertial measurement unit (IMU), which may include an accelerometer and gyroscope to output vehicle roll, pitch, yaw, acceleration, or approximate velocity calculated based on acceleration. The navigation sensor may include a compass to provide heading or a global navigation satellite system (GNSS), such as the Global Positioning System (GPS) to provide location. In an example, the navigation sensor includes a tightly coupled IMU and GNSS system, where the IMU data is used to reduce noise in the GNSS positioning accuracy and the GNSS data is used to reduce inertial positioning noise (e.g., drift).

The navigation maneuver identification system may be embedded on the vehicle 110, and may discard images before the initial maneuver 160 and after the final maneuver 180. The navigation maneuver identification system may be executed on a ground-based computer, which may post-process navigation data and camera images, and select a relevant subset of image data between the initial maneuver 160 and the final maneuver 180.

In an embodiment, vehicle 110 is configured to begin taking photographs in response to identifying the initial maneuver 160. For example, navigation maneuver identification system may be embedded on the vehicle 110, and upon identifying the initial maneuver 160, the navigation maneuver identification system may switch on a camera or send a command to a camera to begin taking photos at regular intervals. In contrast with operating a payload continuously throughout an entire flight, this remote maneuver identification enables the vehicle 110 to initiate or terminate payload operation at a desired time or location. This also enables a remote user to execute payload functionality by controlling vehicle 110 to execute various maneuvers without requiring a separate communication system to control the payload. This remote user input may include a user input of one or more maneuvers for an autonomous or non-autonomous vehicle. For example, a user input may include controlling a partially autonomous UAV to execute a 360-degree turn to initiate payload operation. In another example, a non-autonomous vehicle may be completely controlled by a user, and the user may execute a 270-degree turn to bring about the same orientation as a desired 90-degree turn.

Vehicle 110 may include a control system to cause one or more maneuvers to execute payload functionality. For example, vehicle 110 may include a navigation path that includes predetermined waypoints that define a predetermined vehicle travel path. The waypoint information may also include a location or a travel path segment in which to execute payload functionality. The vehicle 110 may analyze the waypoints and payload functionality segments to identify a suboptimal maneuver. For example, vehicle 110 may determine that an optimal maneuver between the departing path 140 and start of flight path 170 would include a rotation of approximately 120 degrees (i.e., a right turn), and may instead execute a suboptimal rotation of approximately −240 degrees (i.e., a left turn) to result in approximately the same final orientation as the 120 degree turn. Other types of maneuvers may be used, such as adding one or more suboptimal changes in yaw, pitch, roll, or motion in one or more directions.

In addition to taking photographs in response to identifying the initial maneuver 160, one or more additional image capture parameters may be configured based on the initial maneuver 160. For example, identifying the initial maneuver 160 may trigger a change in an image capture interval, where the interval may be based on a time interval between images, a distance traveled between images, or other interval. The image capture parameter may include adjusting an image capture overlap percentage, where the overlapping portions of the images may be used subsequently to join (e.g., stitch) multiple images into a larger image. The image capture parameter may also include an image capture exposure, an image capture focal point, or other image capture parameter.

While the example autonomous vehicle gesture recognition system 100 is described with respect to activation of a camera, other types of payloads may be triggered or configured based on the initial maneuver 160. For example, vehicle 110 may include a radio frequency (RF) energy detection device. The RF energy detection device may be triggered to capture RF measurements in various locations, where the RF measurements and locations may be used to generate an RF map such as a cellular coverage map. In another example, vehicle 110 may include a range detection device to capture range measurements, where the range measurements may be used to generate a three-dimensional range map. The range detection device may include a laser-based light detection and ranging (LIDAR) device, a radio detection and ranging (RADAR) device, an optical rangefinder, a sonic rangefinder, or other range detection device.

Figure 2:
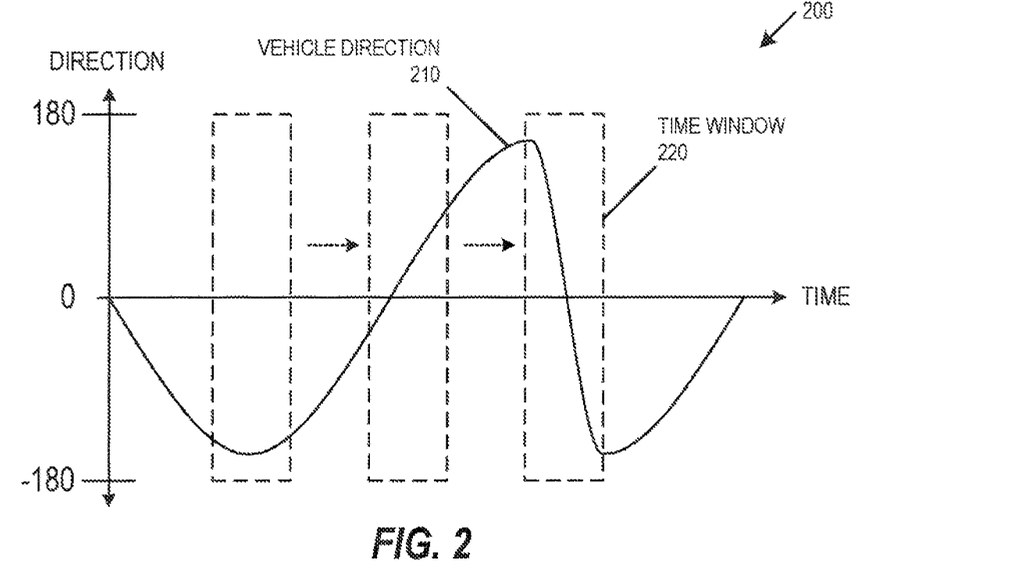
FIG. 2 is a graph of a single vehicle maneuver detection, in accordance with at least one embodiment of the invention.

FIG. 2 is a graph of a single vehicle maneuver detection 200, in accordance with at least one embodiment of the invention. The first vehicle maneuver detection 200 shows a vehicle direction 210 as a function of time. The vehicle direction 210 shows the vehicle starting at 0 degrees, rotating to almost −180 degrees, and rotating back toward 180 degrees. The first vehicle maneuver detection 200 includes a moving maneuver time window 220, where the maneuver time window has an associated width (i.e., duration) and magnitude (i.e. minimum rotation threshold in degrees). The vehicle direction 210 is examined at various time intervals, and a maneuver is detected when a rotation occurs within the duration of the time window 220 and exceeds a minimum rotation threshold. The predetermined rotation may be used to identify a suboptimal rotation around a particular axis, such as a change in yaw that exceeds a 180-degree minimum rotation threshold. Various time window durations or magnitudes may be used for different axes, such as to detect a change in yaw of at least 180 degrees simultaneously occurring with a change in roll of at least 30 degrees. The moving time window 220 duration and magnitude may also be selected to reduce or eliminate falsely identifying maneuvers. For example, as shown in first vehicle maneuver detection 200, a slow 360-degree rotation may not be detected, but a 360-degree rotation that occurs within time window 220 may be identified as a detected maneuver.

Figure 3:
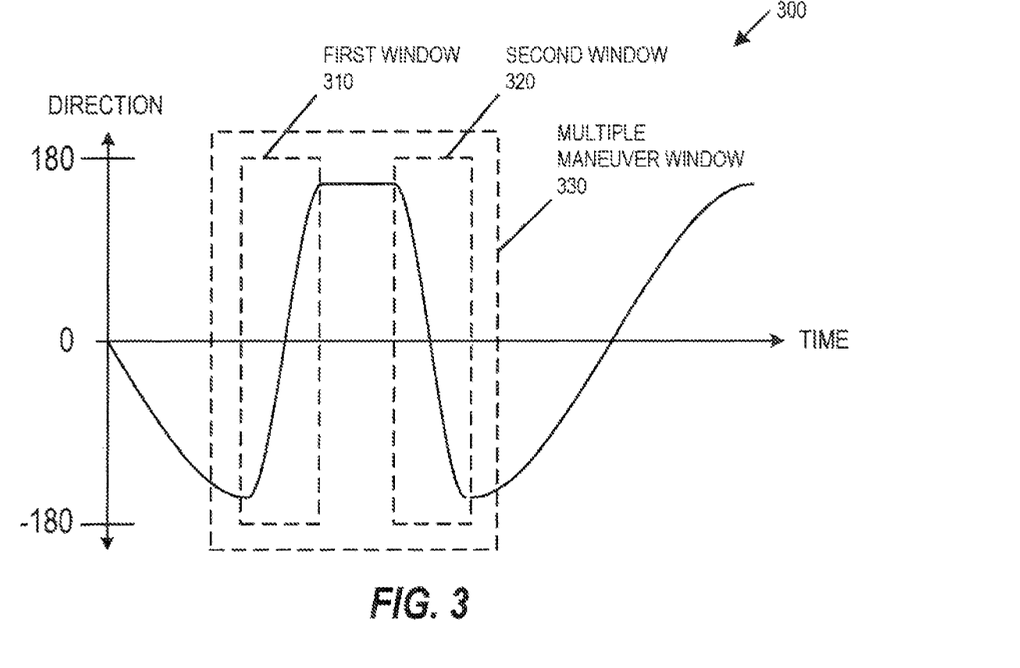
FIG. 3 is a graph of a multiple vehicle maneuver detection, in accordance with at least one embodiment of the invention.

FIG. 3 is a graph of a multiple vehicle maneuver detection 300, in accordance with at least one embodiment of the invention. The second vehicle maneuver detection 300 shows an example of maneuver detection using multiple maneuver windows. A first maneuver window 310 may detect a first maneuver and a second window 320 may detect a second maneuver. A multiple maneuver window 330 may be used to identify when the first and second maneuvers occur within a predetermined multiple maneuver duration.

The first and second maneuvers may be similar, such as detecting a positive (i.e., clockwise) rotation exceeding a positive 180-degree threshold and detecting a negative (i.e., counterclockwise) rotation exceeding a negative 180-degree threshold. The first and second maneuvers may include different threshold values or may occur within different types of maneuvers (e.g., different navigation degrees of freedom). For example, the first and second maneuvers may include a clockwise rotation while ascending, or may include a counterclockwise rotation while descending.

The multiple vehicle maneuver detection 300 may be used to provide additional payload control. For example, a first maneuver may be used to initiate a timed sequence of camera images, and a second maneuver executed within a multiple maneuver window 330 may be used to terminate the timed sequence of camera images. In an embodiment, the vehicle delays initiating a payload until the multiple maneuver window 330 has elapsed to ensure that the multiple maneuver window 330 does not include both a first and second maneuver. The multiple maneuver window 330 may be used to correct an inadvertently executed maneuver, such as when a wind gust blows a UAV off course. The multiple maneuver window 330 may be used to increase the complexity (e.g. bit depth) of commands sent to a vehicle through maneuvers. For example, detection of both a first maneuver and a second maneuver within the multiple maneuver window 330 may execute a multiple-maneuver command.

The multiple maneuver window 330 may be used to determine a time delay for detection of one or more maneuvers. For example, when a first maneuver is detected within the first window 310, the multiple vehicle maneuver detection 300 may delay for the width (i.e. duration) of the multiple maneuver window 330 to allow for a possible detection of a second maneuver. In this example, detection of a second maneuver within the multiple maneuver window 330 executes the multiple-maneuver command, whereas no detection of a second maneuver within the multiple maneuver window 330 executes the first command associated with detection of the first maneuver.

The multiple maneuver window 330 may also be used to command a particular combination of commands, such as executing three different commands based on detection of two maneuvers. For example, a first maneuver detected within the first window 310 executes a first command, a second maneuver detected within the second window 330 executes a second command, and the combination of the first and second maneuvers detected within the multiple maneuver window 330 executes a third command. Various combinations of maneuver windows may be applied to different types of navigation outputs, thereby significantly increasing the number and complexity of command messages that can be conveyed to the vehicle. This detection of multiple maneuvers within specific time windows may be used to conduct synchronous serial communication, such as where execution of multiple maneuvers occurs at a predetermined rate. While FIG. 3 depicts time windows, vehicle maneuver detection may be based on an instantaneous measurement (e.g., a single navigation sensor sample), such as shown in FIG. 4.

Figure 4:
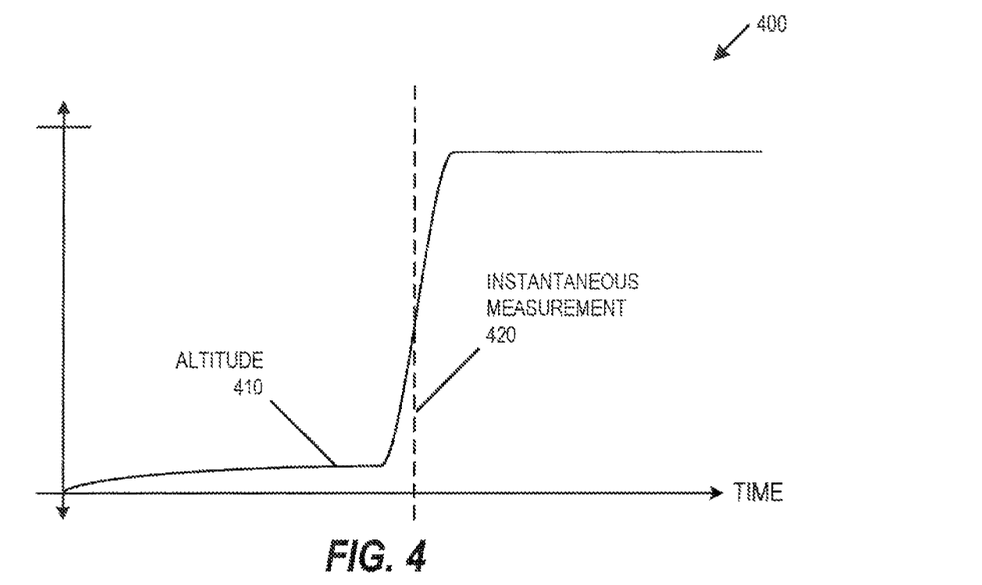
FIG. 4 is a graph of instantaneous measurement detection, in accordance with at least one embodiment of the invention.

FIG. 4 is a graph of instantaneous measurement detection 300, in accordance with at least one embodiment of the invention. In contrast with the use of one or more time windows, instantaneous measurement detection 300 includes identifying a maneuver based on a single navigation sensor data point. For example, the detected maneuver may include a rapid change in elevation 410, such as a rapid ascent detected by an accelerometer or a position sensor (e.g., GPS). The instantaneous measurement 420 reflects the rapid ascent. The instantaneous measurement 420 may be identified at a predetermined time, or the instantaneous measurement 420 may periodically poll one or more navigation sensors for data. The instantaneous measurement detection 300 may detect other navigation parameters, such as a change in roll, pitch, yaw, position, velocity, or other navigation measurements. The instantaneous measurement detection 300 may use various maximum or minimum thresholds to detect events. For example, the rapid change in elevation 410 may be compared against an ascent threshold, and a vehicle maneuver event may be identified when the ascent threshold is exceeded. Conversely, a slow change or a lack of change in a navigation measurement may be compared against a threshold, and vehicle maneuver event may be identified when the threshold is not exceeded.

Figure 5:
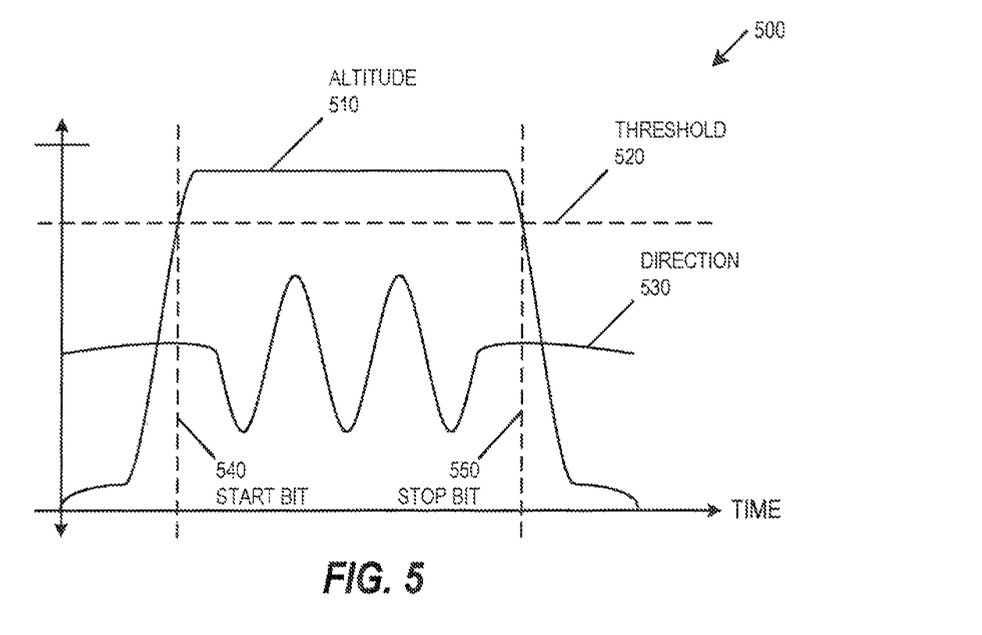
FIG. 5 is a graph of asynchronous serial communication maneuver detection, in accordance with at least one embodiment of the invention.

FIG. 5 is a graph of asynchronous serial communication maneuver detection 500, in accordance with at least one embodiment of the invention. Detection 500 may include using one maneuver type to transmit information, and a second maneuver type to indicate the beginning and ending of the information transmission. Rephrased in terms of asynchronous serial communication, a first maneuver may be interpreted as a start bit, one or more interstitial communication maneuvers following the first maneuver may be interpreted as communication bits, and a final maneuver may be interpreted as a stop bit.

In the embodiment shown in FIG. 5, altitude 510 is used to indicate the beginning and ending of the communication session, and the compass direction 530 is used to provide the communication data. In particular, detection 500 identifies the start bit 540 when the altitude 510 exceeds an altitude threshold 520, then interprets multiple changes in direction 530, then identifies the stop bit 550 when the altitude falls back below the altitude threshold 520.

Other combinations of maneuvers may be used to convey information using asynchronous serial communication. For example, a UAV may descend below a communication altitude threshold to indicate a start bit, then rotate 720 degrees to command a camera shutter speed, and then ascend above the communication altitude threshold to indicate a stop bit. The start bit maneuver and stop bit maneuvers may be based a navigation sensor detection of a location, an orientation, a movement, or another navigation sensor output.

In addition to increasing command complexity, this maneuver-based asynchronous serial communication may be used to simplify maneuvers or to reduce false detection of unintended commands. For example, a 30-degree yaw rotation may be used within standard navigation, and that same 30-degree yaw rotation may be interpreted as a command when it is detected between a maneuver start bit and a maneuver stop bit. This allows more information to be encoded within smaller maneuvers, and therefore allows more information to be encoded within a shorter command duration. In some embodiments, the maneuver stop bit or another maneuver may be used as a maneuver parity bit or in another error-detection schema.

Figure 6:
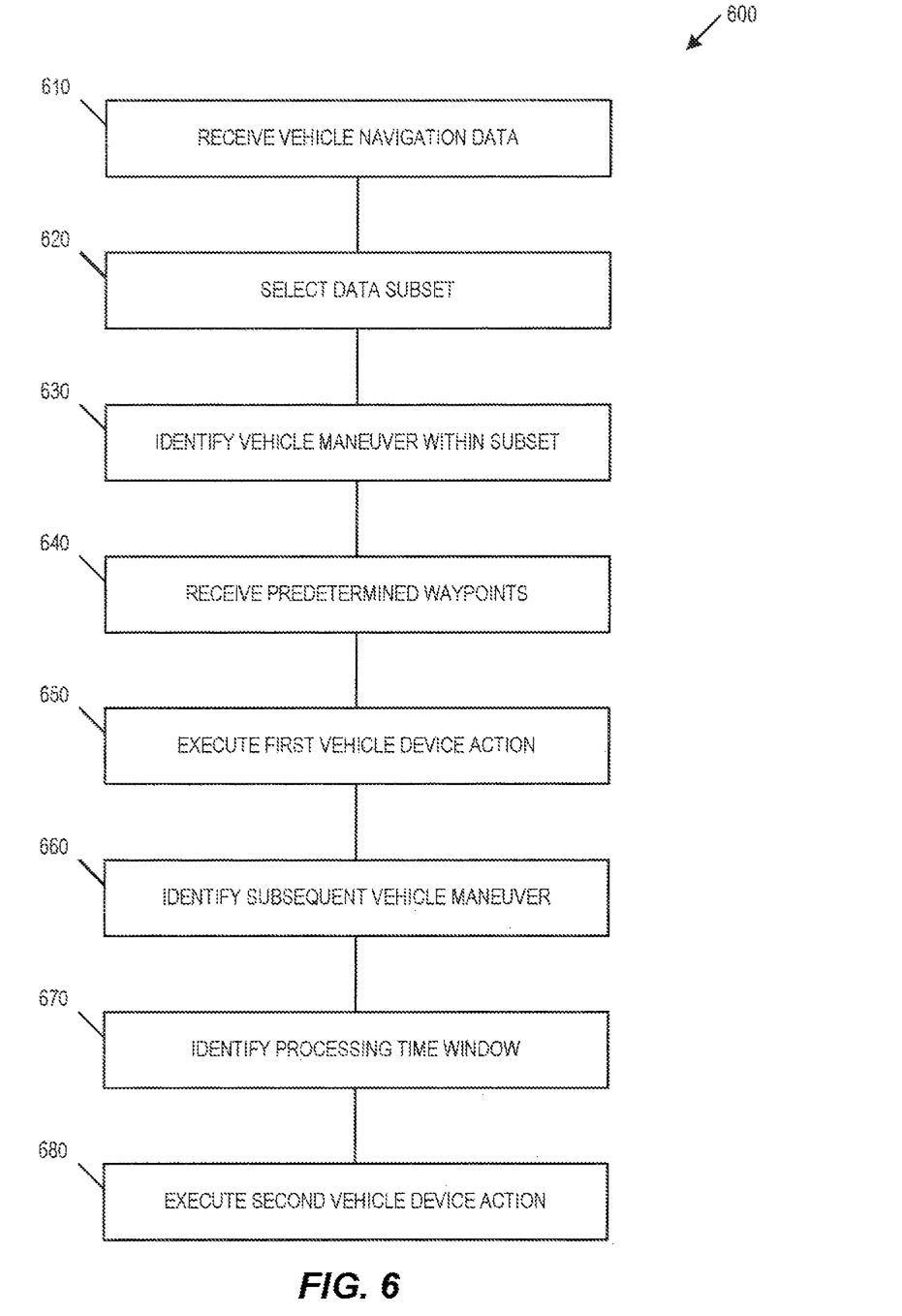
FIG. 6 is a block diagram graph of an autonomous vehicle maneuver recognition method, in accordance with at least one embodiment of the invention.

FIG. 6 is a block diagram graph of an autonomous vehicle maneuver recognition method 600, in accordance with at least one embodiment of the invention. Method 600 includes receiving vehicle navigation data 610 from a navigation sensor within a vehicle, selecting a data subset 620 of the vehicle navigation data, and identifying a vehicle maneuver event 630 within the data subset. The data subset of the vehicle navigation data may an instantaneous vehicle navigation measurement. The data subset may be associated with a predetermined maneuver window duration, and the predetermined maneuver window duration includes a plurality of vehicle navigation measurements.

Method 600 may include receiving 640 a plurality of predetermined waypoints, the plurality of predetermined waypoints defining a predetermined vehicle travel path, identifying a standard navigation maneuver based on a first waypoint and a second waypoint, the standard navigation maneuver including a first direction and a first magnitude in degrees, and causing the vehicle to execute a suboptimal navigation maneuver, the suboptimal navigation maneuver including a suboptimal navigation maneuver, wherein identifying a vehicle maneuver event within the data subset includes identifying the suboptimal navigation maneuver. The suboptimal navigation maneuver may include a second direction opposite from the first direction, and a second magnitude in degrees substantially equal to a difference between 360 degrees and the first magnitude in degrees. The standard navigation maneuver may include at least one of yaw, pitch, and roll, and the suboptimal navigation maneuver may include at least one of yaw, pitch, and roll that is not included in the standard navigation maneuver. The suboptimal navigation maneuver may include a rotation greater than 180 degrees. In addition to or in place of predetermined waypoints, maneuver events may be received from a remote vehicle operator. For example, the first vehicle maneuver event or a subsequent vehicle maneuver event may occur in response to receiving a first or second navigation input event from a remote vehicle operator.

Method 600 may include executing 650 a first vehicle device action in response to identifying a vehicle maneuver event within the data subset. The vehicle device action includes causing an image capture device to adjust an image capture parameter. The image capture parameter may include an image capture interval. The image capture parameter may include an image capture overlap percentage. The image capture parameter may include an image capture exposure. The vehicle method action may include causing the radio frequency energy detection method to capture a plurality of radio frequency measurements. Method 600 may include generating a radio frequency map based on the plurality of radio frequency measurements. Method 600 may include generating a cellular coverage map based on the radio frequency map. Method 600 may include a range detection method, wherein the vehicle method action may include causing the range detection method to capture a plurality of range measurements. Method 600 may include generating a three-dimensional range map based on the plurality of range measurements. The range detection method may include at least one of a laser-based light detection and ranging method, a radio detection and ranging method, an optical rangefinder, and a sonic rangefinder.

Method 600 may include identifying a subsequent maneuver event 660 within the data subset. Method 600 may include interpreting the vehicle navigation data as asynchronous serial communication, the asynchronous serial communication including: identifying the vehicle maneuver event as a start bit, identifying at least one interstitial maneuver event as one or more serial communication bits, the at least one interstitial maneuver event occurring subsequent to the vehicle maneuver event, and identifying the subsequent maneuver event as a stop bit, the subsequent maneuver event occurring subsequent to the at least one interstitial maneuver event.

Method 600 may include identifying a processing time window 670. The time window may include a first time associated with the vehicle maneuver event and a second time associated with the subsequent maneuver event. Based on the first time and second time, and a processing time window is identified for post-processing of relevant data.

Method 600 may include executing a second vehicle device action 680 in response to identifying the subsequent maneuver event within the data subset. Method 600 may include identifying that the vehicle maneuver event and subsequent maneuver event both occur within a predetermined event pair time window, and executing a third vehicle device action in response to identifying that the vehicle maneuver event and subsequent maneuver event both occur within the predetermined event pair time window.

The received vehicle navigation data 610 may be provided by a vehicle navigation sensor. The vehicle navigation sensor may include an inertial measurement unit, and the vehicle navigation data may include a plurality of inertial measurements. The inertial measurement unit may include a gyroscope, and the plurality of inertial measurements may include a plurality of rotation measurements. The inertial measurement unit may include an accelerometer, and the plurality of inertial measurements may include a plurality of acceleration measurements. The inertial measurement unit may include a compass, and the plurality of inertial measurements may include a plurality of compass heading measurements. The navigation sensor may include a global navigation satellite system device, and the vehicle navigation data may include a plurality of location measurements. The navigation sensor may include a tightly coupled inertial navigation system, the tightly coupled inertial navigation system providing a plurality of smoothed inertial measurements and a plurality of smoothed location measurements.

Figure 7:
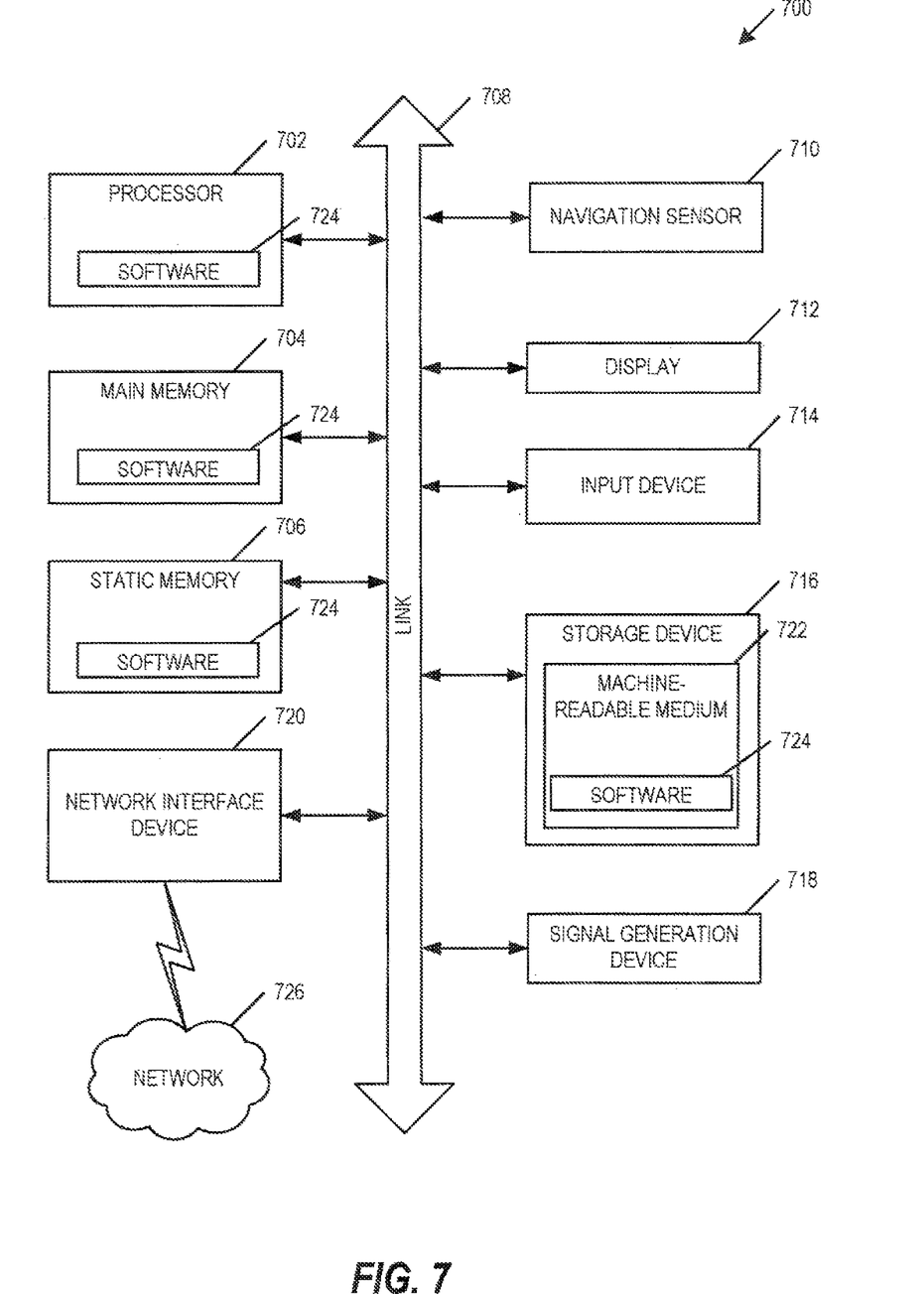
FIG. 7 is a block diagram illustrating an autonomous vehicle navigation system in an example form of an electronic device, according to an example embodiment.

FIG. 7 is a block diagram illustrating an autonomous vehicle navigation system in an example form of an electronic device 700, within which a set or sequence of instructions may be executed to cause the machine to perform any one of the methodologies discussed herein, according to an example embodiment. Electronic device 700 may represent the vehicle shown in FIG. 1, or may represent an electronic device on which the maneuver detection occurs. In alternative embodiments, the electronic device 700 operates as a standalone device or may be connected (e.g., networked) to other machines. In a networked deployment, the electronic device 700 may operate in the capacity of either a server or a client machine in server-client network environments, or it may act as a peer machine in peer-to-peer (or distributed) network environments. The electronic device 700 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, or any electronic device 700 capable of executing instructions (sequential or otherwise) that specify actions to be taken by that machine to detect a user input. Further, while only a single electronic device 700 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The main memory 704 or static memory 706 may be used to store navigation data (e.g., predetermined waypoints) or payload data (e.g., stored captured images).

The electronic device 700 includes a navigation sensor 710. Navigation sensor 710 may include an IMU, which may include an accelerometer and gyroscope to output vehicle roll, pitch, yaw, acceleration, or other inertial data. The navigation sensor 710 may include a compass to provide heading, or may include a GNSS to provide location. The navigation sensor 710 may include a tightly coupled IMU and GNSS system.

The electronic device 700 may further include a display unit 712, where the display unit 712 may include a single component that provides a user-readable display and a protective layer, or another display type. The electronic device 700 may further include an input device 714, such as a pushbutton, a keyboard, an NFC card reader, or a user interface (UI) navigation device (e.g., a mouse or touch-sensitive input). The electronic device 700 may additionally include a storage device 716, such as a drive unit. The electronic device 700 may additionally include a signal generation device 718 to provide audible or visual feedback, such as a speaker to provide an audible feedback or one or more LEDs to provide a visual feedback. The electronic device 700 may additionally include a network interface device 720, and one or more additional sensors (not shown).

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, or within the processor 702 during execution thereof by the electronic device 700. The main memory 704, static memory 706, and the processor 702 may also constitute machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is an autonomous vehicle maneuver recognition device comprising: a navigation sensor within a vehicle to generate vehicle navigation data; a processor to: receive the vehicle navigation data from the navigation sensor; select a data subset of the vehicle navigation data; and identify a vehicle maneuver event within the data subset.

In Example 2, the subject matter of Example 1 optionally includes wherein the data subset of the vehicle navigation data includes an instantaneous vehicle navigation measurement.

In Example 3, the subject matter of any one or more of Examples 1-2 optionally include wherein: the data subset is associated with a predetermined maneuver window duration; and the predetermined maneuver window duration includes a plurality of vehicle navigation measurements.

In Example 4, the subject matter of any one or more of Examples 1-3 optionally include a communication interface to receive a first navigation input from a remote vehicle operator to cause the vehicle to execute the vehicle maneuver event.

In Example 5, the subject matter of any one or more of Examples 1-4 optionally include wherein the vehicle maneuver event includes a suboptimal navigation maneuver.

In Example 6, the subject matter of Example 5 optionally includes a memory to store a plurality of predetermined waypoints, the plurality of predetermined waypoints defining a predetermined vehicle travel path, the processor further to: identify a standard navigation maneuver based on a first waypoint and a second waypoint; identify the suboptimal navigation maneuver based on the standard navigation maneuver; and cause the vehicle to execute the suboptimal navigation maneuver, wherein identifying a vehicle maneuver event within the data subset includes identifying the suboptimal navigation maneuver.

In Example 7, the subject matter of Example 6 optionally includes wherein: the standard navigation maneuver includes a first rotation, the first rotation including a first direction and a first magnitude in degrees; and the suboptimal navigation maneuver includes a second rotation, the second rotation including a second direction opposite from the first direction and a second magnitude in degrees substantially equal to a difference between 360 degrees and the first magnitude in degrees.

In Example 8, the subject matter of any one or more of Examples 6-7 optionally include wherein: the standard navigation maneuver includes at least one of yaw, pitch, and roll; and the suboptimal navigation maneuver includes at least one of yaw, pitch, and roll that is not included in the standard navigation maneuver.

In Example 9, the subject matter of any one or more of Examples 6-8 optionally include degrees.

In Example 10, the subject matter of any one or more of Examples 1-9 optionally include a vehicle device to execute a first vehicle device action in response to identifying a vehicle maneuver event within the data subset.

In Example 11, the subject matter of Example 10 optionally includes an image capture device, wherein the vehicle device action includes causing the image capture device to adjust an image capture parameter.

In Example 12, the subject matter of Example 11 optionally includes wherein the image capture parameter includes an image capture interval.

In Example 13, the subject matter of any one or more of Examples 11-12 optionally include wherein the image capture parameter includes an image capture overlap percentage.

In Example 14, the subject matter of any one or more of Examples 11-13 optionally include wherein the image capture parameter includes an image capture exposure.

In Example 15, the subject matter of any one or more of Examples 10-14 optionally include a radio frequency energy detection device, wherein the vehicle device action includes causing the radio frequency energy detection device to capture a plurality of radio frequency measurements.

In Example 16, the subject matter of Example 15 optionally includes the processor further to generate a radio frequency map based on the plurality of radio frequency measurements.

In Example 17, the subject matter of Example 16 optionally includes the processor further to generate a cellular coverage map based on the radio frequency map.

In Example 18, the subject matter of any one or more of Examples 10-17 optionally include a range detection device, wherein the vehicle device action includes causing the range detection device to capture a plurality of range measurements.

In Example 19, the subject matter of Example 18 optionally includes the processor further to generate a three-dimensional range map based on the plurality of range measurements.

In Example 20, the subject matter of any one or more of Examples 18-19 optionally include wherein the range detection device includes at least one of a laser-based light detection and ranging device, a radio detection and ranging device, an optical rangefinder, and a sonic rangefinder.

In Example 21, the subject matter of any one or more of Examples 1-20 optionally include the processor further to identify a subsequent maneuver event within the data subset.

In Example 22, the subject matter of Example 21 optionally includes the processor further to interpret the vehicle navigation data as asynchronous serial communication, the asynchronous serial communication including: identifying the vehicle maneuver event as a start bit; identifying at least one interstitial maneuver event as one or more serial communication bits, the at least one interstitial maneuver event occurring subsequent to the vehicle maneuver event; and identifying the subsequent maneuver event as a stop bit, the subsequent maneuver event occurring subsequent to the at least one interstitial maneuver event.

In Example 23, the subject matter of any one or more of Examples 21-22 optionally include wherein a second navigation input is received to cause the subsequent maneuver event.

In Example 24, the subject matter of any one or more of Examples 21-23 optionally include the processor further to: identify a first time associated with the vehicle maneuver event; identify a second time associated with the subsequent maneuver event; identify a processing time window for post-processing of relevant data, the processing time window based on the first time and second time.

In Example 25, the subject matter of any one or more of Examples 21-24 optionally include the processor further to execute a second vehicle device action in response to identifying the subsequent maneuver event within the data subset.

In Example 26, the subject matter of any one or more of Examples 21-25 optionally include the processor further to: identify that the vehicle maneuver event and subsequent maneuver event both occur within a predetermined event pair time window; and execute a third vehicle device action in response to identifying that the vehicle maneuver event and subsequent maneuver event both occur within the predetermined event pair time window.

In Example 27, the subject matter of any one or more of Examples 1-26 optionally include wherein: the navigation sensor includes an inertial measurement unit; and the vehicle navigation data includes a plurality of inertial measurements.

In Example 28, the subject matter of Example 27 optionally includes wherein: the inertial measurement unit includes a gyroscope; and the plurality of inertial measurements includes a plurality of rotation measurements.

In Example 29, the subject matter of any one or more of Examples 27-28 optionally include wherein: the inertial measurement unit includes an accelerometer; and the plurality of inertial measurements includes a plurality of acceleration measurements.

In Example 30, the subject matter of any one or more of Examples 27-29 optionally include wherein: the inertial measurement unit includes a compass; and the plurality of inertial measurements includes a plurality of compass heading measurements.

In Example 31, the subject matter of any one or more of Examples 27-30 optionally include wherein; the navigation sensor includes a global navigation satellite system device; and the vehicle navigation data includes a plurality of location measurements.

In Example 32, the subject matter of Example 31 optionally includes wherein the navigation sensor includes a tightly coupled inertial navigation system, the tightly coupled inertial navigation system providing a plurality of smoothed inertial measurements and a plurality of smoothed location measurements.

Example 33 is an autonomous vehicle maneuver recognition method comprising: receiving vehicle navigation data from a navigation sensor within a vehicle; selecting a data subset of the vehicle navigation data; and identifying a vehicle maneuver event within the data subset.

In Example 34, the subject matter of Example 33 optionally includes wherein the data subset of the vehicle navigation data includes an instantaneous vehicle navigation measurement.

In Example 35, the subject matter of any one or more of Examples 33-34 optionally include wherein: the data subset is associated with a predetermined maneuver window duration; and the predetermined maneuver window duration includes a plurality of vehicle navigation measurements.

In Example 36, the subject matter of any one or more of Examples 33-35 optionally include receiving a first navigation input from a remote vehicle operator to cause the vehicle to execute the vehicle maneuver event.

In Example 37, the subject matter of any one or more of Examples 33-36 optionally include receiving a plurality of predetermined waypoints, the plurality of predetermined waypoints defining a predetermined vehicle travel path; identifying a standard navigation maneuver based on a first waypoint and a second waypoint, the standard navigation maneuver including a first direction and a first magnitude in degrees; and causing the vehicle to execute a suboptimal navigation maneuver, wherein identifying a vehicle maneuver event within the data subset includes identifying the suboptimal navigation maneuver.

In Example 38, the subject matter of Example 37 optionally includes wherein the suboptimal navigation maneuver includes a second direction opposite from the first direction; and a second magnitude in degrees substantially equal to a difference between 360 degrees and the first magnitude in degrees.

In Example 39, the subject matter of any one or more of Examples 37-38 optionally include wherein: the standard navigation maneuver includes at least one of yaw, pitch, and roll; and the suboptimal navigation maneuver includes at least one of yaw, pitch, and roll that is not included in the standard navigation maneuver.

In Example 40, the subject matter of any one or more of Examples 33-39 optionally include degrees.

In Example 41, the subject matter of any one or more of Examples 33-40 optionally include executing a first vehicle device action in response to identifying a vehicle maneuver event within the data subset.

In Example 42, the subject matter of Example 41 optionally includes wherein the vehicle device action includes causing an image capture device to adjust an image capture parameter.

In Example 43, the subject matter of Example 42 optionally includes wherein the image capture parameter includes an image capture interval.

In Example 44, the subject matter of any one or more of Examples 42-43 optionally include wherein the image capture parameter includes an image capture overlap percentage.

In Example 45, the subject matter of any one or more of Examples 42-44 optionally include wherein the image capture parameter includes an image capture exposure.

In Example 46, the subject matter of any one or more of Examples 41-45 optionally include a radio frequency energy detection action, wherein the vehicle device action includes causing the radio frequency energy detection action to capture a plurality of radio frequency measurements.

In Example 47, the subject matter of Example 46 optionally includes generating a radio frequency map based on the plurality of radio frequency measurements.

In Example 48, the subject matter of Example 47 optionally includes generating a cellular coverage map based on the radio frequency map.

In Example 49, the subject matter of any one or more of Examples 41-48 optionally include a range detection action, wherein the range detection action includes capturing a plurality of range measurements.

In Example 50, the subject matter of Example 49 optionally includes generating a three-dimensional range map based on the plurality of range measurements.

In Example 51, the subject matter of any one or more of Examples 49-50 optionally include wherein the range detection action includes at least one of a laser-based light detection and ranging method, a radio detection and ranging method, an optical rangefinder, and a sonic rangefinder.

In Example 52, the subject matter of any one or more of Examples 33-51 optionally include identifying a subsequent maneuver event within the data subset.

In Example 53, the subject matter of Example 52 optionally includes interpreting the vehicle navigation data as asynchronous serial communication, the asynchronous serial communication including: identifying the vehicle maneuver event as a start bit; identifying at least one interstitial maneuver event as one or more serial communication bits, the at least one interstitial maneuver event occurring subsequent to the vehicle maneuver event; and identifying the subsequent maneuver event as a stop bit, the subsequent maneuver event occurring subsequent to the at least one interstitial maneuver event.

In Example 54, the subject matter of any one or more of Examples 52-53 optionally include receiving a second navigation input to cause the subsequent maneuver event.

In Example 55, the subject matter of any one or more of Examples 52-54 optionally include identifying a first time associated with the vehicle maneuver event; identifying a second time associated with the subsequent maneuver event; identifying a processing time window for post-processing of relevant data, the processing time window based on the first time and second time.

In Example 56, the subject matter of any one or more of Examples 52-55 optionally include executing a second vehicle device action in response to identifying the subsequent maneuver event within the data subset.

In Example 57, the subject matter of any one or more of Examples 52-56 optionally include identifying that the vehicle maneuver event and subsequent maneuver event both occur within a predetermined event pair time window; and executing a third vehicle device action in response to identifying that the vehicle maneuver event and subsequent maneuver event both occur within the predetermined event pair time window.

In Example 58, the subject matter of any one or more of Examples 33-57 optionally include wherein: the navigation sensor includes an inertial measurement unit; and the vehicle navigation data includes a plurality of inertial measurements.

In Example 59, the subject matter of Example 58 optionally includes wherein: the inertial measurement unit includes a gyroscope; and the plurality of inertial measurements includes a plurality of rotation measurements.

In Example 60, the subject matter of any one or more of Examples 58-59 optionally include wherein: the inertial measurement unit includes an accelerometer; and the plurality of inertial measurements includes a plurality of acceleration measurements.

In Example 61, the subject matter of any one or more of Examples 58-60 optionally include wherein: the inertial measurement unit includes a compass; and the plurality of inertial measurements includes a plurality of compass heading measurements.

In Example 62, the subject matter of any one or more of Examples 58-61 optionally include wherein; the navigation sensor includes a global navigation satellite system device; and the vehicle navigation data includes a plurality of location measurements.

In Example 63, the subject matter of Example 62 optionally includes wherein the navigation sensor includes a tightly coupled inertial navigation system, the tightly coupled inertial navigation system providing a plurality of smoothed inertial measurements and a plurality of smoothed location measurements.

Example 64 is at least one machine-readable medium including instructions, which when executed by a computing system, cause the computing system to perform any of the methods of Examples 33-63.

Example 65 is an apparatus comprising means for performing any of the methods of Examples 33-63.

Example 66 is at least one machine-readable storage medium, comprising a plurality of instructions that, responsive to being executed with processor circuitry of a computer-controlled device, cause the computer-controlled device to: receive vehicle navigation data from a navigation sensor within a vehicle; select a data subset of the vehicle navigation data; and identify a vehicle maneuver event within the data subset.

In Example 67, the subject matter of Example 66 optionally includes wherein the data subset of the vehicle navigation data includes an instantaneous vehicle navigation measurement.

In Example 68, the subject matter of any one or more of Examples 66-67 optionally include wherein: the data subset is associated with a predetermined maneuver window duration; and the predetermined maneuver window duration includes a plurality of vehicle navigation measurements.

In Example 69, the subject matter of any one or more of Examples 66-68 optionally include the instructions further causing the computer-controlled device to receive a first navigation input from a remote vehicle operator to cause the vehicle to execute the vehicle maneuver event.

In Example 70, the subject matter of any one or more of Examples 66-69 optionally include the instructions further causing the computer-controlled device to: receive a plurality of predetermined waypoints, the plurality of predetermined waypoints defining a predetermined vehicle travel path; identify a standard navigation maneuver based on a first waypoint and a second waypoint, the standard navigation maneuver including a first direction and a first magnitude in degrees; identify a suboptimal navigation maneuver; and cause the vehicle to execute the suboptimal navigation maneuver.

In Example 71, the subject matter of Example 70 optionally includes wherein the suboptimal navigation maneuver includes a second direction opposite from the first direction; and a second magnitude in degrees substantially equal to a difference between 360 degrees and the first magnitude in degrees.

In Example 72, the subject matter of any one or more of Examples 70-71 optionally include wherein: the standard navigation maneuver includes at least one of yaw, pitch, and roll; and the suboptimal navigation maneuver includes at least one of yaw, pitch, and roll that is not included in the standard navigation maneuver.

In Example 73, the subject matter of any one or more of Examples 66-72 optionally include degrees.

In Example 74, the subject matter of any one or more of Examples 66-73 optionally include the instructions further causing the computer-controlled device to execute a first vehicle device action in response to identifying a vehicle maneuver event within the data subset.

In Example 75, the subject matter of Example 74 optionally includes the instructions further causing the computer-controlled device to cause an image capture device to adjust an image capture parameter.

In Example 76, the subject matter of Example 75 optionally includes wherein the image capture parameter includes an image capture interval.

In Example 77, the subject matter of any one or more of Examples 75-76 optionally include wherein the image capture parameter includes an image capture overlap percentage.

In Example 78, the subject matter of any one or more of Examples 75-77 optionally include wherein the image capture parameter includes an image capture exposure.

In Example 79, the subject matter of any one or more of Examples 74-78 optionally include the instructions further causing the computer-controlled device to capture a plurality of radio frequency measurements.

In Example 80, the subject matter of Example 79 optionally includes the instructions further causing the computer-controlled device to generate a radio frequency map based on the plurality of radio frequency measurements.

In Example 81, the subject matter of Example 80 optionally includes the instructions further causing the computer-controlled device to generate a cellular coverage map based on the radio frequency map.

In Example 82, the subject matter of any one or more of Examples 74-81 optionally include the instructions further causing the computer-controlled device to execute a range detection action, wherein the range detection action includes capturing a plurality of range measurements.

In Example 83, the subject matter of Example 82 optionally includes the instructions further causing the computer-controlled device to generate a three-dimensional range map based on the plurality of range measurements.

In Example 84, the subject matter of any one or more of Examples 82-83 optionally include wherein the range detection action includes at least one of a laser-based light detection and ranging method, a radio detection and ranging method, an optical rangefinder, and a sonic rangefinder.

In Example 85, the subject matter of any one or more of Examples 66-84 optionally include the instructions further causing the computer-controlled device to identify a subsequent maneuver event within the data subset.

In Example 86, the subject matter of Example 85 optionally includes the instructions further causing the computer-controlled device to interpret the vehicle navigation data as asynchronous serial communication, the instructions further causing the computer-controlled device to: identify the vehicle maneuver event as a start bit; identify at least one interstitial maneuver event as one or more serial communication bits, the at least one interstitial maneuver event occurring subsequent to the vehicle maneuver event; and identify the subsequent maneuver event as a stop bit, the subsequent maneuver event occurring subsequent to the at least one interstitial maneuver event.

In Example 87, the subject matter of any one or more of Examples 85-86 optionally include the instructions further causing the computer-controlled device to receive a second navigation input to cause the subsequent maneuver event.

In Example 88, the subject matter of any one or more of Examples 85-87 optionally include the instructions further causing the computer-controlled device to: identify a first time associated with the vehicle maneuver event; identify a second time associated with the subsequent maneuver event; identify a processing time window for post-processing of relevant data, the processing time window based on the first time and second time.

In Example 89, the subject matter of any one or more of Examples 85-88 optionally include the instructions further causing the computer-controlled device to execute a second vehicle device action in response to identifying the subsequent maneuver event within the data subset.

In Example 90, the subject matter of any one or more of Examples 85-89 optionally include the instructions further causing the computer-controlled device to: identify that the vehicle maneuver event and subsequent maneuver event both occur within a predetermined event pair time window; and execute a third vehicle device action in response to identifying that the vehicle maneuver event and subsequent maneuver event both occur within the predetermined event pair time window.

In Example 91, the subject matter of any one or more of Examples 66-90 optionally include wherein: the navigation sensor includes an inertial measurement unit; and the vehicle navigation data includes a plurality of inertial measurements.

In Example 92, the subject matter of Example 91 optionally includes wherein: the inertial measurement unit includes a gyroscope; and the plurality of inertial measurements includes a plurality of rotation measurements.

In Example 93, the subject matter of any one or more of Examples 91-92 optionally include wherein: the inertial measurement unit includes an accelerometer; and the plurality of inertial measurements includes a plurality of acceleration measurements.

In Example 94, the subject matter of any one or more of Examples 91-93 optionally include wherein: the inertial measurement unit includes a compass; and the plurality of inertial measurements includes a plurality of compass heading measurements.

In Example 95, the subject matter of any one or more of Examples 91-94 optionally include wherein; the navigation sensor includes a global navigation satellite system device; and the vehicle navigation data includes a plurality of location measurements.

In Example 96, the subject matter of Example 95 optionally includes wherein the navigation sensor includes a tightly coupled inertial navigation system, the tightly coupled inertial navigation system providing a plurality of smoothed inertial measurements and a plurality of smoothed location measurements.

Example 97 is an autonomous vehicle maneuver recognition apparatus comprising means for receiving vehicle navigation data from a navigation sensor within a vehicle; means for selecting a data subset of the vehicle navigation data; and means for identifying a vehicle maneuver event within the data subset.

In Example 98, the subject matter of Example 97 optionally includes wherein the data subset of the vehicle navigation data includes an instantaneous vehicle navigation measurement.

In Example 99, the subject matter of any one or more of Examples 97-98 optionally include wherein: the data subset is associated with a predetermined maneuver window duration; and the predetermined maneuver window duration includes a plurality of vehicle navigation measurements.

In Example 100, the subject matter of any one or more of Examples 97-99 optionally include means for receiving a first navigation input from a remote vehicle operator to cause the vehicle to execute the vehicle maneuver event.

In Example 101, the subject matter of any one or more of Examples 97-100 optionally include means for receiving a plurality of predetermined waypoints, the plurality of predetermined waypoints defining a predetermined vehicle travel path; means for identifying a standard navigation maneuver based on a first waypoint and a second waypoint, the standard navigation maneuver including a first direction and a first magnitude in degrees; and means for causing the vehicle to execute a suboptimal navigation maneuver, wherein identifying a vehicle maneuver event within the data subset includes identifying the suboptimal navigation maneuver.

In Example 102, the subject matter of Example 101 optionally includes wherein the suboptimal navigation maneuver includes a second direction opposite from the first direction; and a second magnitude in degrees substantially equal to a difference between 360 degrees and the first magnitude in degrees.

In Example 103, the subject matter of any one or more of Examples 101-102 optionally include wherein: the standard navigation maneuver includes at least one of yaw, pitch, and roll; and the suboptimal navigation maneuver includes at least one of yaw, pitch, and roll that is not included in the standard navigation maneuver.

In Example 104, the subject matter of any one or more of Examples 97-103 optionally include degrees.

In Example 105, the subject matter of any one or more of Examples 97-104 optionally include means for executing a first vehicle device action in response to identifying a vehicle maneuver event within the data subset.

In Example 106, the subject matter of Example 105 optionally includes wherein the vehicle device action includes causing an image capture device to adjust an image capture parameter.

In Example 107, the subject matter of Example 106 optionally includes wherein the image capture parameter includes an image capture interval.

In Example 108, the subject matter of any one or more of Examples 106-107 optionally include wherein the image capture parameter includes an image capture overlap percentage.

In Example 109, the subject matter of any one or more of Examples 106-108 optionally include wherein the image capture parameter includes an image capture exposure.

In Example 110, the subject matter of any one or more of Examples 105-109 optionally include means for a radio frequency energy detection action, wherein the vehicle device action includes means for causing the radio frequency energy detection action to capture a plurality of radio frequency measurements.

In Example 111, the subject matter of Example 110 optionally includes means for generating a radio frequency map based on the plurality of radio frequency measurements.

In Example 112, the subject matter of Example 111 optionally includes means for generating a cellular coverage map based on the radio frequency map.

In Example 113, the subject matter of any one or more of Examples 105-112 optionally include means for a range detection action, wherein the range detection action includes means for capturing a plurality of range measurements.

In Example 114, the subject matter of Example 113 optionally includes means for generating a three-dimensional range map based on the plurality of range measurements.

In Example 115, the subject matter of any one or more of Examples 113-114 optionally include wherein the range detection action includes at least one of a means for a laser-based light detection and ranging method, a means for a radio detection and ranging method, an optical rangefinder, and a sonic rangefinder.

In Example 116, the subject matter of any one or more of Examples 97-115 optionally include means for identifying a subsequent maneuver event within the data subset.

In Example 117, the subject matter of Example 116 optionally includes means for interpreting the vehicle navigation data as asynchronous serial communication, the asynchronous serial communication including: means for identifying the vehicle maneuver event as a start bit; means for identifying at least one interstitial maneuver event as one or more serial communication bits, the at least one interstitial maneuver event occurring subsequent to the vehicle maneuver event; and means for identifying the subsequent maneuver event as a stop bit, the subsequent maneuver event occurring subsequent to the at least one interstitial maneuver event.

In Example 118, the subject matter of any one or more of Examples 116-117 optionally include means for receiving a second navigation input to cause the subsequent maneuver event.

In Example 119, the subject matter of any one or more of Examples 116-118 optionally include means for identifying a first time associated with the vehicle maneuver event; means for identifying a second time associated with the subsequent maneuver event; means for identifying a processing time window for post-processing of relevant data, the processing time window based on the first time and second time.

In Example 120, the subject matter of any one or more of Examples 116-119 optionally include means for executing a second vehicle device action in response to identifying the subsequent maneuver event within the data subset.

In Example 121, the subject matter of any one or more of Examples 116-120 optionally include means for identifying that the vehicle maneuver event and subsequent maneuver event both occur within a predetermined event pair time window; and means for executing a third vehicle device action in response to identifying that the vehicle maneuver event and subsequent maneuver event both occur within the predetermined event pair time window.

In Example 122, the subject matter of any one or more of Examples 97-121 optionally include wherein: the navigation sensor includes an inertial measurement unit; and the vehicle navigation data includes a plurality of inertial measurements.

In Example 123, the subject matter of Example 122 optionally includes wherein: the inertial measurement unit includes a gyroscope; and the plurality of inertial measurements includes a plurality of rotation measurements.

In Example 124, the subject matter of any one or more of Examples 122-123 optionally include wherein: the inertial measurement unit includes an accelerometer; and the plurality of inertial measurements includes a plurality of acceleration measurements.

In Example 125, the subject matter of any one or more of Examples 122-124 optionally include wherein: the inertial measurement unit includes a compass; and the plurality of inertial measurements includes a plurality of compass heading measurements.

In Example 126, the subject matter of any one or more of Examples 122-125 optionally include wherein; the navigation sensor includes a global navigation satellite system device; and the vehicle navigation data includes a plurality of location measurements.

In Example 127, the subject matter of Example 126 optionally includes wherein the navigation sensor includes a tightly coupled inertial navigation system, the tightly coupled inertial navigation system including means for providing a plurality of smoothed inertial measurements and a plurality of smoothed location measurements.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An unmanned aerial vehicle gesture recognition device comprising:
   a navigation sensor on an unmanned aerial vehicle, the navigation sensor includes an inertial measurement unit that generates vehicle navigation data as the unmanned aerial vehicle is in flight and the unmanned aerial vehicle includes a payload;
   a memory on the unmanned aerial vehicle that stores a first predefined vehicle gesture pattern associated with a first predefined waypoint, the first predefined vehicle gesture pattern comprises a first predefined yaw axis rotation that occurs within a first predefined period of time and that exceeds a first predefined minimum magnitude;
   a navigation maneuver identification system that is in communication with the payload and the memory, the navigation maneuver identification system is configured to:
      receive the vehicle navigation data from the inertial measurement unit;
      select a first data subset of the vehicle navigation data, the first data subset comprises vehicle navigation data from the first predefined waypoint;
      as the unmanned aerial vehicle is in flight, identify an occurrence of the first predefined gesture pattern in the first data subset by comparing the first data subset with the first predefined vehicle gesture pattern stored in the memory;
      generate a first signal when the occurrence of the first predefined vehicle gesture pattern is identified in the first data subset; and
      provide the first signal to the payload that triggers a first payload event of the payload.

2. The unmanned aerial vehicle gesture recognition device of claim 1, wherein the payload comprises an image capture device.

3. The unmanned aerial vehicle gesture recognition device of claim 1, wherein the payload comprises a radio frequency energy detection device.

4. The unmanned aerial vehicle gesture recognition device of claim 1, wherein the navigation maneuver identification system is further configured to:

wherein the unmanned aerial vehicle is in flight, and wherein the memory stores a second predefined vehicle gesture pattern comprising a second yaw axis rotation that occurs within a second period of time and that exceeds a second minimum magnitude within the second period of time, identify an occurrence of the second predefined vehicle gesture pattern in a second data subset of vehicle navigation data from a second predefined waypoint by comparing the second predefined gesture pattern with the second data subset;

generate a second signal when the occurrence of the second predefined vehicle gesture pattern is identified in the second data subset; and provide the second signal to the payload that triggers a second payload event of the payload.

5. The unmanned aerial vehicle gesture recognition device of claim 1, wherein the first predefined vehicle gesture pattern further includes a change in roll or a change in pitch of the unmanned aerial vehicle.

6. The unmanned aerial vehicle gesture recognition device of claim 1, wherein a flight path stored in the memory is traversed by the unmanned aerial vehicle after the occurrence of the first predefined gesture pattern.

7. The unmanned aerial vehicle gesture recognition device of claim 1, wherein the first payload event comprises turning the payload on or turning the payload off.

8. A method of controlling operation of a payload on an unmanned aerial vehicle comprising:

as the unmanned aerial vehicle is in flight, sending vehicle navigation data from an inertial measurement unit on the unmanned aerial vehicle to a navigation maneuver identification system on the unmanned aerial vehicle;

analyzing the vehicle navigation data using the navigation maneuver identification system;

wherein a memory on the unmanned aerial vehicle stores a first predefined vehicle gesture pattern, and wherein the first vehicle gesture pattern includes a first predefined yaw axis rotation of the unmanned aerial vehicle that occurs within a first predefined period of time and that exceeds a first predefined minimum magnitude within the first predefined period of time, and identifying, based on the vehicle navigation data analysis, that the first predefined vehicle gesture pattern is executed by the unmanned aerial vehicle at a first predefined waypoint; and when the navigation maneuver identification system identifies that the first predefined vehicle gesture pattern is executed by the unmanned aerial vehicle at the first predefined waypoint, generating a first signal and sending the first signal to the payload that triggers a first payload event of the payload.

9. The method of claim 7, wherein the payload comprises an image capture device.

10. The method of claim 8, further comprising:

wherein the memory stores a second predefined gesture pattern, and wherein the second predefined gesture pattern includes a second predefined yaw axis rotation of the unmanned aerial vehicle that occurs within a second predetermined period of time and exceeds a second predetermined minimum magnitude within the second predetermined period of time, and identifying, based on the vehicle navigation data analysis, an occurrence of the second predefined vehicle gesture pattern that is executed by the unmanned aerial vehicle at a second predefined waypoint; and when the navigation maneuver identification system identifies the second vehicle gesture pattern at the second predefined waypoint, generating a second signal and sending the second signal to the payload that triggers a second payload event of the payload.

11. The method of claim 8, wherein the first predefined vehicle gesture pattern further includes a change in roll or a change in pitch of the unmanned aerial vehicle.

12. The method of claim 8, wherein the first predefined vehicle gesture pattern occurs separate from a flight path of the unmanned aerial vehicle.

13. The method claim 8, wherein the first payload event comprises turning the payload on or turning the payload off.

14. A method of controlling operation of a camera on an unmanned aerial vehicle comprising:

as the unmanned aerial vehicle is in flight, sending vehicle navigation data from an inertial measurement unit on the unmanned aerial vehicle to a navigation maneuver identification system on the unmanned aerial vehicle;

analyzing the vehicle navigation data using the navigation maneuver identification system;

wherein a memory on the unmanned aerial vehicle stores a first predefined vehicle gesture pattern, and wherein the first vehicle gesture pattern includes one or more of a first predefined change in yaw, roll, pitch or acceleration of the unmanned aerial vehicle, and the first predefined change in yaw, roll, pitch or acceleration occurs within a first predefined period of time and exceeds a first predefined minimum magnitude within the first predefined period of time, and identifying, based on the vehicle navigation data analysis, that the first predefined vehicle gesture pattern is executed by the unmanned aerial vehicle at a first predefined waypoint; and when the navigation maneuver identification system identifies that the first predefined vehicle gesture pattern is executed by the unmanned aerial vehicle at the first predefined waypoint, generating a first signal and sending the first signal to the camera that triggers a first change in operation of the camera.

15. The method of claim 14, wherein the first predefined vehicle gesture pattern includes a yaw axis rotation that is at least 180 degrees.

16. The method of claim 14, wherein the first predefined vehicle gesture pattern includes a combination of a change in yaw axis rotation together with a change in roll or a change in pitch.

17. The method of claim 14, further comprising identifying, based on the vehicle navigation data analysis, a second predefined vehicle gesture pattern that is executed by the unmanned aerial vehicle at a second predefined waypoint;

the second predefined vehicle gesture pattern is stored in the memory and includes one or more of a second predefined change in yaw, roll, pitch or acceleration of the unmanned aerial vehicle, and the second predefined change in yaw, roll, pitch or acceleration occurs within a second predefined period of time and exceeds a second predefined minimum magnitude within the second predefined period of time;

wherein the second predefined vehicle gesture pattern occurs after the first predefined vehicle gesture pattern; and when the navigation maneuver identification system identifies the second predefined vehicle gesture pattern, generating a second signal and sending the second signal to the camera that triggers a second change in operation of the camera.

18. The method of claim 14, wherein a flight path stored in the memory is traversed by the unmanned aerial vehicle after the occurrence of the first predefined gesture pattern.

19. The method claim 14, wherein the first change in operation comprises turning the camera on or turning the camera off.

* * * * *